UNITED STATES PATENT OFFICE.

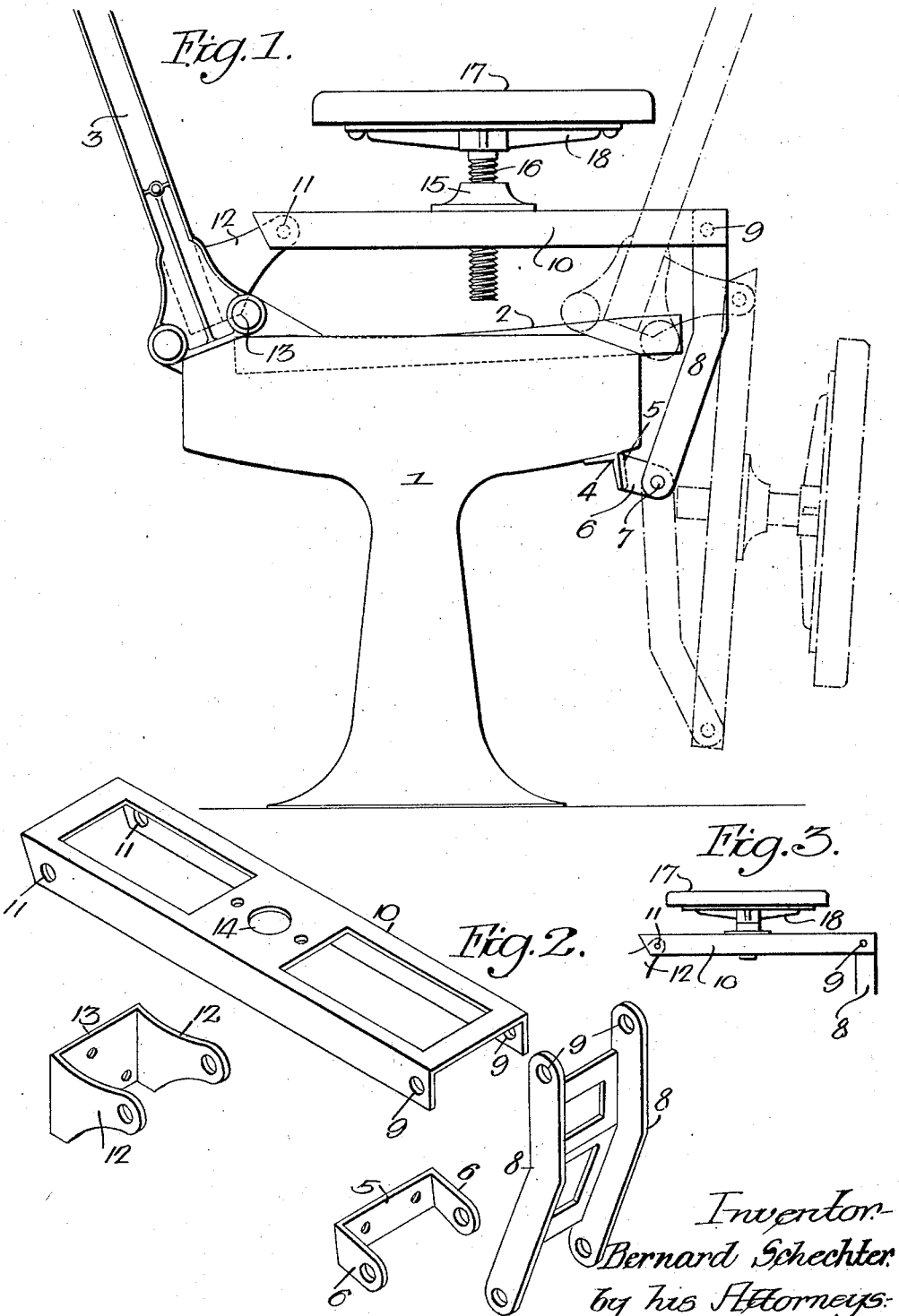

BERNARD SCHECHTER, OF ST. LOUIS, MISSOURI, ASSIGNOR TO AMERICAN CAR COMPANY, OF ST. LOUIS, MISSOURI, A CORPORATION OF MISSOURI.

CAR-SEAT.

1,363,057.  Specification of Letters Patent.  Patented Dec. 21, 1920.

Application filed February 4, 1920. Serial No. 356,283.

*To all whom it may concern:*

Be it known that I, BERNARD SCHECHTER, a citizen of the United States, residing in St. Louis, Missouri, have invented certain Improvements in Car-Seats, of which the following is a specification.

One object of my invention is to provide a seat for a motorman which can be attached to the ordinary car seat of a motor driven car.

A further object of the invention is to construct the motorman's seat so that when the back of the car seat is shifted in one position the motorman's seat will assume a position above the car seat, and when the back is moved to the opposite position the motorman's seat will be shifted to one side and below the car seat and back so that the seat can be occupied by passengers.

This invention is especially adapted for use in double ended cars in which the motorman can operate the car from either end.

In the accompanying drawings:

Figure 1 is a side view of a car seat structure illustrating my improvement;

Fig. 2 is a detached perspective view of the parts; and

Fig. 3 is a view of a modification.

1 is an end frame and pedestal of a car seat structure. 2 is the seat of any ordinary type. 3 is the movable back connected to the side members of the seat in any manner desired and adapted to be shifted from one side of the seat to the other, according to the direction in which the car is moving. Extending from one end frame to the other are bars 4. I secure a bracket 5 to one of these bars 4, as indicated in Fig. 1. This bracket has lugs 6 carrying a pivot pin 7 to which is attached a link 8 formed as clearly shown in Fig. 2. This link is pivoted at 9 to a carrying member 10. The opposite end of this carrying member is pivoted at 11 to the lugs 12 of a bracket 13 secured to the movable back 3. The carrying member 10 is perforated at the center as at 14 for the reception of a screw plate 15, which is secured rigidly to this carrying member and has a threaded opening for the reception of the threaded spindle 16 of the motorman's seat 17, which is round, in the present instance, and is secured to the spindle 16 by spiders 18 so that on turning the seat it can be raised and lowered.

In some instances, as shown in Fig. 3, the seat section may be rigidly secured to the carrying member 10. This motorman's seat structure can be located in any position on the seat desired, depending upon the location of the controlling mechanism of the car.

When this motorman's seat structure is applied to a car seat, it can be shifted by operating the seat back either to a position directly above the car seat, as shown in full lines in Fig. 1, or to a position at one side of the car seat and below the seat level, as indicated by dotted lines on said figure, so that when the seat is at the forward end of the car, the back is shifted and the motorman's seat is directly above the car seat, but when the seat is at the rear of the car, then the back is shifted so that the car seat can be used by passengers and the motorman's seat is at the rear side of the car seat, and under the back and when in this position it will not interfere with the passengers.

I claim:

1. The combination of a car seat having a movable back; a motorman's seat structure pivoted to the car seat at one end and pivoted to the back at the opposite end and so arranged that when the back is shifted from one side of the car seat to the other, the motorman's seat will be moved into a position either above the car seat or to one side of the seat.

2. The combination of a car seat having a movable back; a seat structure having a carrying member, one end of said carrying member being pivoted to a back of the car seat; a link pivoted to the other end of the carrying member, said link being in turn pivoted to the body of the car seat; and a motorman's seat mounted on the said carrying member, the parts being so arranged that when the back section is moved from one side of the seat to the other, the motorman's seat will be shifted in to and out of position.

3. The combination of a car seat having a movable back; a detachable motorman's seat structure consisting of two brackets, one bracket secured to the under side of a car seat, and the other being secured to the movable back of the car seat; a carrying member pivotally connected to the latter bracket; a link connecting the first mentioned bracket to the carrying member; a screw plate mounted on the carrying member; and a seat having a screw-threaded stem adapted to the screw-plate, the parts being so arranged that when the pivoted back is shifted from one side of the car seat to the other, the motorman's seat structure will be moved into and out of position.

4. The combination of a car seat structure, having a movable back, a seat carrying member pivotally connected to the back and a link connecting the carrying member to the body of the seat structure below the seat, and so arranged that when the back is moved to one side of the seat, the seat carrying member is above the car seat and when the back is moved to the opposite side of the seat the carrying member is shifted to the same side of the seat as the back and below the same.

BERNARD SCHECHTER.